United States Patent [19] [11] 3,874,693
Patzelt et al. [45] Apr. 1, 1975

[54] PROTECTIVE DEVICE, ESPECIALLY FOR THE PASSENGERS OF MOTOR VEHICLES

[75] Inventors: Helmut Patzelt, Fellbach; Gerhard Schiesterl, Etting; Albert Seybold, Esslingen, all of Germany

[73] Assignee: Daimler-Benz Aktiengesellschaft, Stuttgart, Germany

[22] Filed: Oct. 24, 1972

[21] Appl. No.: 300,221

[30] Foreign Application Priority Data
Oct. 23, 1971 Germany............................ 2152902

[52] U.S. Cl............................ 280/150 AB, 5/348 R
[51] Int. Cl............................................ B60r 21/08
[58] Field of Search .............. 280/150 AB; 5/348 R

[56] References Cited
UNITED STATES PATENTS
| | | | |
|---|---|---|---|
| 3,552,770 | 1/1971 | Berryman | 280/150 AB |
| 3,586,347 | 6/1971 | Garey | 280/150 AB |
| 3,617,073 | 11/1971 | Landsman et al. | 280/150 AB |
| 3,618,981 | 11/1971 | Leising et al. | 280/150 AB |
| 3,727,942 | 4/1973 | Arnston et al. | 280/150 AB |

Primary Examiner—David Schonberg
Assistant Examiner—John P. Silverstrim
Attorney, Agent, or Firm—Craig & Antonelli

[57] ABSTRACT

A protective installation, especially for the passengers of motor vehicles, with an air bag which is automatically inflatable by means of a gas when exceeding a predetermined vehicle deceleration; an insert is thereby coordinated to the air bag which during the inflation extends transversely to the main flow direction of the gases and is disposed at a distance to the bag bottom, in relation to the main flow direction; the insert forms within its area disposed in the main gas flow an impact surface for the inflowing gas which is securely connected with the bag bottom facing the passengers.

5 Claims, 1 Drawing Figure

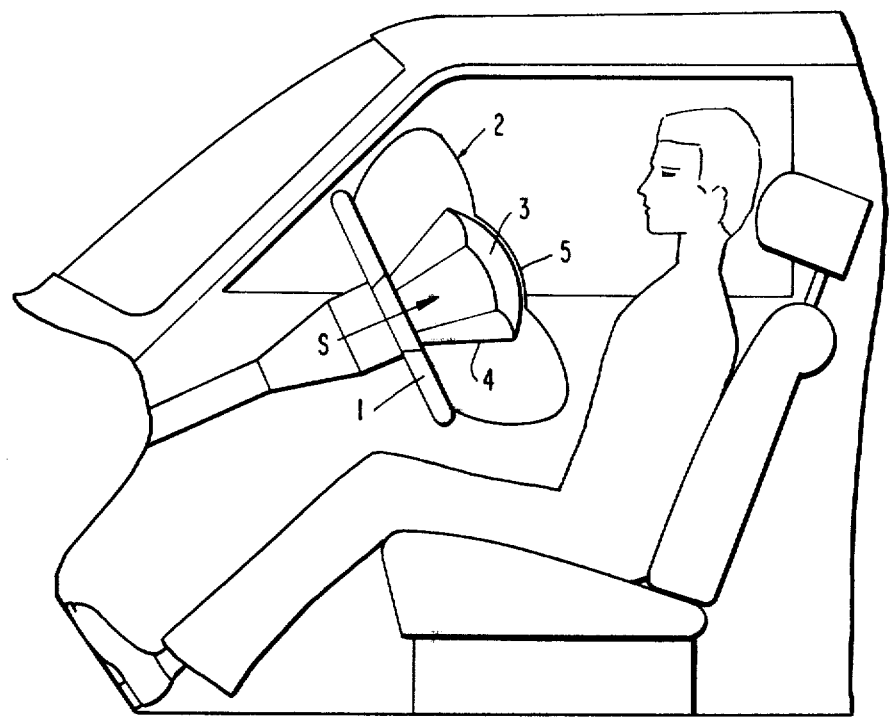

PROTECTIVE DEVICE, ESPECIALLY FOR THE PASSENGERS OF MOTOR VEHICLES

The present invention relates to a protective device, especially for the passengers of motor vehicles, with an air bag which is automatically inflatable by means of a gas when exceeding a predetermined vehicle deceleration, whereby an insert is coordinated to the air bag which, during the inflation, extends transversely to the main flow direction of the gas and is disposed at a distance to the bag bottom in relation to the main flow direction of the gases, which insert forms within its area lying within the main gas stream an impact or deflection surface, as disclosed in the copending application Ser. No. 233,418 filed in the U.S. Patent Office on Mar. 10, 1972 and assigned to the assignee of the present application, the subject matter of which is incorporated herein by reference.

It was intended to be avoided by such a construction of the air bag that the air bag is inflated by the inflowing gases at the beginning of the inflation operation essentially only in one direction, and more particularly toward the person to be protected and that the air bag expands in the flow direction of the gases initially with relatively small diameter and with corresponding high velocity lying near the supersonic range.

Tests with such air bags, however, have demonstrated that the filling operation of the air bag does not proceed as yet in an optimum manner. More particularly, it has been discovered that by reason of the kinetic energy of the air bag thrust out of its normal rest position, the gas flow deflected by the insert is not sufficient in many cases in order to inflate the air bag—as desired—spherically or approximately in the form of a disk disposed parallel to the surface of the steering wheel. The unfolding of the air bag, instead, proceeds in such a manner that at first still an excessively strong expansion in the direction of the gas jet takes place whereby the air bag can be thrown, for example, into the face of a vehicle passenger. Furthermore, the disadvantage results therefrom that a vehicle passenger may have approached the steering wheel during this first phase of the inflation of the air bag, for example, already so far that a radial expansion of the air bag, as planned, is then no longer possible. The consequence thereof is that the air bag is forced or pressed in the upward direction by the wedging effect which results between the upper body and the steering wheel, and thereby now only protects the head of the passengers whereas a protective action for the chest is no longer assured by the air bag.

Consequently, it is the aim of the present invention to so further develop an air bag of the aforementioned type that the indicated disadvantages are avoided with certainty.

Accordingly, a protective device, especially for the passengers of motor vehicles, with an air bag is proposed which upon exceeding a predetermined vehicle deceleration is automatically inflatable by means of a gas, whereby an insert which during inflation extends transversely to the main flow direction of the gases and is disposed at a distance to the bag bottom, in relation to the main flow direction of the gases, is coordinated to the air bag which forms in its area disposed in the main gas flow an impact or deflecting surface for the inflowing gas, as described in the aforementioned copending application, whereby, according to the present invention, the air bag is rigidly connected with the insert within the area of its bottom facing the passenger.

A forcible radial expansion of the air bag is achieved by such a type of construction whereby the height of the thus-formed "air bag disk" is determined essentially by the length of the holding means of the insert.

Simultaneously, however, a further considerable advantage is achieved by such a construction of an air bag. More particularly, tests have demonstrated that during the inflation operation with a prior art air bag, forces up to 400 kp occur in the hitherto customary air bag at the clamping place or fixing point thereof whereas in an air bag according to the present invention, the holding means of the insert absorb a portion of these forces whereby the air bag itself is relieved at its clamping or fixing place.

Accordingly, it is an object of the present invention to provide a protective device, especially for the passengers of motor vehicles, which avoids by simple means the aforementioned shortcomings and drawbacks encountered in the prior art.

Another object of the present invention resides in a protective device, especially for the passengers of motor vehicles, in which an improper inflation of the air bag is precluded with certainty.

A further object of the present invention resides in an air bag for motor vehicles, adapted to be automatically deflated in gas of a predetermined deceleration, which will be reliably inflated into the predetermined desired shape.

Still a further object of the present invention resides in a protective device using an air bag for the passengers of motor vehicles which assures optimum protection for not only the head but also the chest of the driver.

Still another object of the present invention resides in a protective device using an air bag for motor vehicles in which the air bag is relieved of extremely high forces particularly at its clamping or mounting place in or at the steering wheel.

These and further objects, features and advantages of the present invention will become more apparent from the following description when taken in connection with the accompanying drawing which shows, for purposes of illustration only, one embodiment in accordance with the present invention, and wherein:

The single FIGURE is a schematic side view of a passenger motor vehicle equipped with a protective device in accordance with the present invention.

Referring not to the single FIGURE of the drawing which schematically illustrates a part of a side view of a passenger motor vehicle, partly broken away, an air bag generally designated by reference numeral 2 is secured at the steering wheel 1 of the passenger motor vehicle in any conventional manner, which forms no part of the present invention and therefore is not illustrated in detail. In the single FIGURE, the air bag 2 is shown in its inflated or filled condition. An insert 3 is arranged on the inside of the air bag 2 which is disposed in the main flow direction S of the gases serving for purposes of filling the air bag 2. The insert 3 is also anchored within the area of the steering wheel 1 by way of holding means constructed in the illustrated embodiment as ropes or cables 4. The bottom 5 of the air bag 2, which faces the vehicle passenger, is thereby securely connected with the insert 3, for example, by gluing or sewing. Any suitable adhesive substance may be used for effecting the gluing or bonding. As to the rest, the air bag 2 as well as the insert 3 are constructed in any known appropriate manner, for example, as more fully described in the copending application.

While we have shown and described only one embodiment in accordance with the present invention, it is understood that the same is not limited thereto but is susceptible of numerous changes and modifications as known to those skilled in the art, and we therefore do not wish to be limited to the details shown and described herein but intend to cover all such changes and modifications as are encompassed by the scope of the appended claims.

We claim:

1. In a protective installation of the type including an air bag means a means for releasing gas into said air bag means, a gas deflection means arranged within said air bag means such that said air bag means is inflated into an approximately disk form having a major surface substantially perpendicular to the flow of gases released into said air bag means, and means for anchoring said air bag means to a mounting element, the improvement comprising connecting means for rigidly connecting at least a portion of said gas deflection means to the interior of said air bag means at said major surface such that said gas deflection means extends transversely to the gas flow, and holding means for holding said gas deflection means upon inflation of said air bag means at a predetermined distance from said means for anchoring said air bag means, said holding means being a plurality of ropes or cables, said ropes or cables holding said gas deflection means at a plurality of connection points of said gas deflection means, said plurality of connection points being laterally beyond said connecting means for rigidly connecting at least a portion of said gas deflection means to the interior of said air bag means.

2. A protective installation according to claim 1, wherein said connecting means is an adhesive bond applied between said air bag means and said portion of said gas deflection means.

3. A protective installation according to claim 1, wherein said connecting means is a sewed-on connection between said air bag means and said portion of said gas deflection means.

4. A protective installation according to claim 1, wherein said mounting element includes a fixed part of a vehicle, and said air bag means and said holding means are both anchored at said fixed parts.

5. A protective installation according to claim 4, wherein said fixed part is a vehicle steering wheel.

* * * * *